United States Patent Office 3,316,092
Patented Apr. 25, 1967

3,316,092
DIAZOTYPE MATERIAL COMPRISING A METAL SULFATE NITROGENOUS COMPOUND AND POLYMERIC ANHYDRIDE
Robert J. Klimkowski, Luigi Amariti, and Gerson E. Beauchamp, Chicago, Ill., assignors to Eugene Dietzgen Co., Chicago, Ill., a corporation of Delaware
No Drawing. Filed May 9, 1963, Ser. No. 279,331
4 Claims. (Cl. 96—91)

The present invention relates to improved diazotype photoprinting materials. More particularly, the subject invention is directed to heat developable diazotype photoprinting compositions.

In heat developable diazotype photoprinting systems, a composition consisting of a diazo compound, an azo coupling component, and a base generating compound is formed on a suitable base. A solution of the various materials is brushed or otherwise applied to the base. Following the removal of volatiles from the liquid coating, the paper, cloth, plastic, etc., is ready for photoprinting. In making the print the treated base is passed through a suitable apparatus wherein the base is exposed to light beneath a translucent original or master. In those areas of the base that are reached by the light, the diazo compound is at least partially destroyed. In those areas that are beneath opaque lines or designs, on the other hand, the diazo compound is not affected by the light. The print is developed in the apparatus by passing the treated paper over a heated roller or beneath a heat source whereby the temperature of the paper is raised above the decomposition point of the base generating compound. The basic material (usually ammonia) initiates a reaction between the diazo compound and the coupler forming an azo dye. A description of a heat developable process is set forth in a copending application Ser. No. 5,688 which was filed on Feb. 1, 1960. The disclosure of application Ser. No. 5,688 is incorporated in the present specification by reference.

One of the more serious problems which has been encountered in the use of heat developable compositions lies in the tendency of such materials to form deposits on the mechanical parts of the developing machine. Relatively large quantities of nitrogenous materials are generated during the production of the azo dye. If urea is used as the base generating compound, ammonia and cyanic acids are produced during the reaction. The cyanic acid is highly reactive and, under high temperature conditions, has only a transient existence. In all probability, the cyanic acid reacts almost immediately with ammonia to form ammonium cyanate, urea, biuret, triuret, and like compounds. These materials tend to deposit on the sensitive mechanical components of the apparatus. Prolonged accumulation of the deposits often causes malfunction of the equipment. Additionally, a portion of such deposits remains trapped within the developing chamber some of which eventually is tranferred to the sheet of paper being developed. The copies that are produced under such conditions have undesirable brown smudges.

The principal object of the present invention is to provide improved diazotype photoprinting materials which can be used in a heat developable system without the formation of substantial amounts of harmful deposits on the mechanical components of the apparatus.

Another object of the invention is to provide a heat developable diazotype photoprinting composition which can be used without the formation of brown smudges and the like on the developed reproduction.

Still another object is to provide an improved heat developable diazotype photoprinting composition having an excellent shelf life.

A still further object of the invention is to provide an improved heat developable diazotype photoprinting composition which is capable of forming reproductions having increased colored density.

Other objects will become apparent to those skilled in the art from the following detailed description of the invention.

In general, the present invention comprises the discovery of a method by which it is possible to prevent the escape and subsequent depositing of nitrogenous substances on the inner surfaces of the developing apparatus. This objective is achieved through the use of particular polymeric anhydrides in the heat developable composition. The polymeric anhydrides are linear copolymers of methyl vinyl ether and maleic anhydride. These copolymers have also been found to improve the shelf life of the reproduction paper and to increase the color density of the reproductions. In a preferred embodiment, the copolymers are applied to the reproduction material (paper, cloth, plastic, etc.) as an emulsion or suspension. In a further improved embodiment, the copolymers are combined with a particular metal sulfate such as cadmium sulfate and this combination of materials is applied to the base.

As was pointed out above, the polymeric anhydrides which are used in the subject invention are copolymers of methyl vinyl ether and maleic anhydride. The structure of the polymer molecule is as follows:

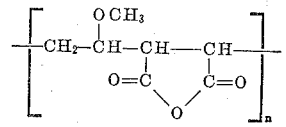

The polymer has a unit molecular weight of 156 and has a softening point range of from about 200 to 225° C. The specific viscosity determined on a 1% solution of the copolymer in methyl ethyl ketone at 25° C. can range from about $\eta_{sp}$ 0.1 to $\eta_{sp}$ 3.5, and preferably from about $\eta_{sp}$ 0.5 to 3.0.

The function of the above described copolymers is not fully understood. It is known, however, that such materials will cross-link with urea, ammonia, and other nitrogenous substances at temperatures of 300° F. or above. The reactions do not occur to any considerable extent at lower temperatures. Inasmuch as the development temperature of thermally developed diazo paper customarily is in excess of 300° F., it is believed that the copolymers cross-link with the most active nitrogenous substances being generated, that is, with those materials which ordinarily would leave the coating.

The amount of the subject copolymers that is added to the aqueous coating solution can vary widely. For best results, however, from about 1% to about 15%, and preferably from about 2% to about 10% by weight of the copolymers, should be added based on the weight of the water. If this amount of material is added, however, the solution would tend to become either non-homogeneous or extremely viscous. This difficulty is avoided by adding the copolymers to the solution in the form of an emulsion or suspension. Surprisingly, it was found that a satisfactory viscosity range is obtained as well as the previously described benefits when the copolymer is used in this manner. Sensitizers making use of the copolymer emulsions or suspensions had sufficient resistance to hydrolysis so as to enable a diazo coating operation to be performed without vicosity build-up or separation of the copolymer from sensitizer.

In producing a satisfactory emulsion of the copolymer and water a high-speed shear mixer or ball milling apparatus can be used for controlled periods of time. Such methods are somewhat critical in that agglomerates are formed in the slurry if the mixing operation is not continued for a sufficient period of time whereby separation of the copolymer from the sensitizer solution occurs during the coating operation. If the mixing operation is carried out for too long a period of time, hydrolysis and subsequent partial dissolving of the resins occur, thus increasing the viscosity of the sensitizer as well as forming a gelatinous globule of resin around many of the resin particles. Either of these extreme conditions would cause a roughness of the coating and spotting in the resultant print.

It was found that the difficulties caused either by too long a mixing period or too short a period could be avoided by admixing with the subject copolymers a given amount of a particular metal sulfate. The presence of the metal sulfate in the sensitizing formula makes it possible to ball mill the materials in water for at least 24 hours without having the resultant grind show any viscosity changes on standing for periods in excess of two weeks. The preferred sulfates are cadmium sulfate and zinc sulfate. Other sulfates which could be used in the process include nickel sulfate, cobalt sulfate, aluminum sulfate, magnesium sulfate, and ceric ammonium sulfate. The amount of sulfate used in the process with respect to the amount by weight of polymeric anhydride should vary from about 1 part sulfate to about 1 part polymeric anhydride to about 12 parts sulfate to about 1 part polymeric anhydride, and preferably from about 2 to about 8 parts sulfate per part of polymeric anhydride.

In practice, the suspension of ground up polymeric anhydride (preferably with the metal sulfate) is added to the sensitizer solution containing the diazo, coupler, urea, etc. The resultant composition consisting of the predissolved chemicals and the suspension is stable for a period of time in excess of 10 hours. In this way, a practical diazo coating material is obtained for thermally developed diazo systems.

The use of the copolymers of the present invention increases the shelf life of the coated reproduction paper when stored under moist, warm conditions. The subject resinous copolymers also increase the color of the resultant print and improve the physical feel of the paper after development. It is believed that the increase in shelf life is due to the fact that the resin is being coated on the paper in its anhydride form. For this reason it is essential that the resin be in its anhydride state. The increase in color of the resultant print is believed to be due to the fact that the resin protects the diazo compound from decomposition during the development process. The improvement in the feel of the paper is an indication that the subject copolymer is interacting with certain of the nitrogenous substances which are generated during the process. Where the copolymer is not used, the paper has an undesirable waxy or slimy feel.

The amount of polymeric anhydride added to the sensitized layer based on the weight of urea or other compound producing an alkaline reaction can vary from about 1 part urea to 1 part polymeric anhydride to 20 parts urea to 1 part polymeric anhydride. Preferably, the ratio of urea (or other compound producing an alkaline reaction when heated) to polymeric anhydride is from 4:1 to 15:1, and most preferred, from about 7:1 to 10:1.

The following examples are illustrative of the present invention.

EXAMPLE I

Semitransparent diazo process paper was coated with a black line formulation consisting of the following components:

| | |
|---|---:|
| Water 30° C. _____l__ | 45 |
| Concentrated sulfuric acid _____l__ | 1.2 |
| Methylene blue _____g__ | 1 |
| 2,3 - dihydroxynaphthalene - 6 - sodium sulfonate _____kg__ | 0.900 |
| Copolymer resorcinol coupler _____kg__ | 2.5 |
| Thiourea _____g__ | 500 |
| Urea _____kg__ | 20 |
| Gantrez 169 (methyl vinyl ether-maleic anhydride copolymer)-cadmium sulfate emulsion _____kg__ | 26.5 |
| p-Diazophenylmorpholino zinc chloride salt __kg__ | 1.75 |
| Starch _____g__ | 500 |

To prepare the emulsion, six (6) kilograms of the copolymer, 24 kilograms of cadmium sulfate, and 24 liters of water were placed in a ball mill. The mixture was milled for 2–6 hours. The process paper was coated at the rate of about 30 grams of diazo compound per 1,000 square feet. After the paper had been air dried it was placed in sandwich relationship with a superimposed original containing typed characters. The sandwich was exposed to ultraviolet radiation to destroy the diazo in all areas except those portions screened by the typed characters and was heated to a temperature of about 300° F. in a developing machine of the type described in U.S. Patent 3,012,141. A very intense black line copy of the original was produced. The print had excellent shelf life characteristics as did the paper prior to the printing operation. Contrary to the results obtained using standard formulations, substantially no deposits were formed on the working parts of the developing machine even after extensive use.

EXAMPLE II

Semitransparent diazo process paper was coated with a blue line formulation consisting of the following components:

| | |
|---|---:|
| Water 30° C. _____l__ | 45 |
| Concentrated sulfuric acid _____l__ | 1.7 |
| 2,3 - dihydroxynaphthalene - 6 - sodium sulfonate _____kg__ | 4 |
| Thiourea _____g__ | 500 |
| Urea _____kg__ | 25 |
| Gantrez 169 (methyl vinyl ether-maleic anhydride copolymer)-cadmium sulfate emulsion ____kg__ | 27 |
| p-Diazophenylmorpholino zinc chloride salt __kg__ | 1.25 |
| Dimethyl-p-diazo aniline _____kg__ | 0.75 |
| Starch _____kg__ | 1.25 |

In preparing the copolymer-sulfate emulsion, six (6) kilograms of the copolymer were placed in a ball mill along with 25.2 kilograms of cadmium sulfate and 24 liters of water. The mixture was then ball milled for 4 hours. The copy paper was prepared as described in Example I and was printed in a heat producing machine of the type described in U.S. Patent 3,012,141. Copies made using the paper were of a high quality. The paper was a slow printing type and formed a very intense blue line. The shelf life characteristics of the formed copy as well as the unprinted but sensitized paper were excellent. Once again, no deposits were formed on the various parts of the machine.

EXAMPLE III

Semitransparent diazo process paper was coated with a standard printing blue line formulation consisting of the following components:

| | |
|---|---:|
| Water 30° C. _____l__ | 45 |
| Concentrated sulfuric acid _____l__ | 1.5 |
| 2,3 - dihydroxynaphthalene - 6 - sodium sulfonate _____kg__ | 4 |
| Thiourea _____g__ | 500 |
| Urea _____kg__ | 25 |
| Gantrez 169 (methyl vinyl ether-anhydride copolymer)-cadmium sulfate emulsion _____kg__ | 27 |
| p-Diazophenylmorpholino zinc chloride salt __kg__ | 0.950 |
| Starch _____kg__ | 2.5 |

To prepare the emulsion, six (6) kilograms of the copolymer were placed in a ball mill along with 25.2 kilograms of cadmium sulfate and 24 liters of water. The mixture was ball milled for 4 hours. The paper was coated in the manner described in Example I. After the paper had been air dried it was placed in sandwich relationship with a superimposed original containing typed characters. The sandwich was exposed to ultraviolet radiation to destroy the diazo in all areas except those portions screened by the typed characters. The paper was then heated to a temperature of about 300° F. in a developing machine of the type described in U.S. Patent 3,012,141. The reproduction was of high quality and had excellent shelf life characteristics. Contrary to the results obtained using standard formulations, substantially no deposits were formed on the working parts of the developing machine even after extensive use.

A wide variety of diazo compounds can be used in the subject formulations. The nature of the particular diazo compound does not constitute a part of the subject invention. It is preferred to employ as the diazo compound one of the commonly used stabilized diazonium salts, preferably the zinc chloride double salt. Other stabilized derivatives may be used, for example, the cadmium chloride or stannic chloride double salts, or the fluoborates.

Exemplary diazo compounds which may be employed are the diazonium salts obtained by diazotization of the following amines:

p-Amino-N,N-dimethylaniline
p-Amino-N,N-diethylaniline
p-Amino-N,N-dipropylaniline
p-Amino-N-ethyl-N-propylaniline
p-Amino-N-ethylaniline
p-Amino-N-ethyl-N-β-hydroxyethylaniline
p-Amino-N-methyl-N-β-hydroxyethylaniline
p-Amino-N,N-di-β-hydroxyethylaniline
p-Amino-m-ethoxy-N,N-diethylaniline
p-Amino-N-ethyl-o-toluidine
p-Amino-N-ethyl-m-toluidine
p-Amino-N,N-diethyl-m-toluidine
p-Amino-N-ethyl-N-hydroxyethyl-m-toluidine
p-Amino-N-ethyl-N-benzylaniline
p-Amino-N-ethyl-N-β-hydroxyethyl-m-toluidine
N-p-amino-phenylmorpholine
N-(2,5-diethoxy-4-aminophenyl)-morpholine
p-Amino-diphenylamine
3-aminocarbazole and the like.

It is preferred to employ a diazonium salt, in the form of a stabilized derivative as indicated above, having the following structural formula:

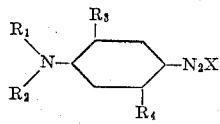

X represents an acid anion, such as a halide or a sulfate ion, $R_1$ is hydrogen or an aliphatic radical, preferably alkyl, aralkyl, hydroxyalkyl, or a radical which together with $R_2$ and N forms a cyclic basic amine radical. $R_2$ is an aliphatic radical, preferably alkyl, aralkyl, hydroxyalkyl, or a radical which together with $R_1$ and N forms a radical of a cyclic basic amine. $R_3$ and $R_4$ may be hydrogen, alkyl, or alkoxy. The several alkyl radicals are preferably lower alkyl radicals. In addition to these preferred compounds, it is contemplated that other compounds might be employed, such as those having the foregoing composition and which contain an acyl group as $R_1$ and/or $R_2$.

The following azo coupling agents are among those which can be used in the subject process and in preparing the subject products:

2,3-dihydroxynaphthalene
2,3-dihydroxynaphthalene-6-sulfonic acid
Resorcinol
Acetoacetanilide
7-hydroxy-1,2-naphthimidazole
1-phenyl-3-methyl-5-pyrazolone
2-naphthol-3,6-disulfonic acid and the like.

When employing the coupling components having a high coupling energy, such as resorcinol and acetoacetanilide, it is advisable to select a diazo compound having a small coupling energy, and the diazo layer may require a higher degree of stabilization against precoupling.

It is desirable to add an acid stabilizing agent to the composition. These agents include such acids as sulfuric acid and organic acids such as malonic, gluconic, cyanoacetic, maleic, tartaric, citric, diglycolic, oxalic, acetic, and malic acids, and anhydrides of such acids, e.g., the lactones. Reference to such acids is intended to include the equivalent anhydrides. Other acids which have been found to be of substantial help in maintaining the stability of the compositions and improving shelf life are aromatic sulfonic acids such as m-benzenedisulfonic acid and inorganic acids such as sulfuric acid.

Preferred compounds which produce an alkaline reaction when heated include those which yield ammonia by decomposition or dissociation. The compounds include, for example, the ureas, i.e., urea and its derivatives, in particular, guanidine, alkyl substituted urea and alkyl substituted guanidines, said alkyl groups containing from 1 to 4 carbon atoms such as methyl urea, ethyl urea, propyl urea, and butyl urea, and hydroxy alkyl ureas such as hydroxy methyl urea and hydroxy ethyl urea. It is often advantageous to use a plurality of such compounds, such as mixtures of urea and guanidine, and urea and tetramethyl guanidine. Other compounds of this type which can be used in the subject process include sulfamide and cyanamide.

Organic nitrogen base salts which produce an alkaline reaction when heated may be employed, particularly salts of amines with volatile or decomposable acids such as acetic acid, malonic acid, gulconic acid, and other heat fugitive acids. Amino-paraffins and especially hydroxylated derivatives thereof or amino alcohols are preferred, particularly those having low volatility, substantial alkalinity, and no odor, and which are resistant to oxidation. Examples of such amines are tri-(hydroxymethyl)-aminomethane, 2-amino-2-methyl-1,3-propanediol, ethanolamine, diethanolamine, and ethyl diethanolamine. These materials are used in conjunction with appropriate acid stabilizers. The aforementioned guanidines are also basic, and their basicity may provide or contribute to the necessary alkaline reaction, with or without decomposition thereof to produce ammonia. Other compounds which are contemplated include the ammonium salts of weak acids, such as ammonium gluconate, ammonium acetate, ammonium carbonate, ammonium diglycolate, and ammonium oleate. The compounds containing the ammonium ion presently are not preferred as the materials produced therewith tend to have a reduced shelf life.

The subject formulations can be used in either a direct printing process or a reflex process. Paper, cloth, plastic sheet materials, plastic impregnated materials, and metal bodies all may be employed as the base material in the direct printing process, provided that the material is not so heat-conductive as to interfere with the process. The reflex process requires that the base be capable of transmitting the heat-producing radiations, and conducting the heat from the original to the sensitive layer. Various drafting and printmaking papers are suitable, as are regenerated cellulose, synthetic plastic and other such sheet materials capable of transmitting the radiation without substantial absorption thereof.

The diazo compound, coupling component, acid stabilizer, copolymer-metal sulfate, and alkali generator are applied to the base in solution by one of the conventional coating methods. The materials are preferably dissolved in water, and the one-phase liquid coat is dried by evaporation to a residual moisture content of preferably less than about 5%. A volatile organic solvent may also be employed, although such is not ordinarily necessary and therefore is not preferred due to the increased cost and normal disadvantages attendant upon such use. It is necessary that the solvent be one which can be removed substantially completely in the drying process, so as not to have an adverse effect on the shelf life.

The diazo compound is preferably employed in a proportion of about 1 to 10% by weight on the basis of the water or other solvent content of the sensitizer composition. The composition is applied to the base at standard rates of application, for example, application to diazo process paper is made at the rate of about 10 to 50 grams of diazo compound per one thousand square feet.

The coupling component is employed in a proportion preferably at least sufficient to constitute a stoichiometric amount with respect to the diazo compound, and preferably in substantial excess. Thus, about 2 to 15 equivalents of coupler per equivalent of diazo compound is preferred in most cases.

The quantity of alkaline reacting material employed should be sufficient to elevate the pH of the sensitized layer to that required for coupling, and this quantity will likewise depend upon the characteristics of the material and of the other substances in the sensitive layer. It has been found, for example, that compounds of the type of urea may be employed in a weight ratio to diazo compound of about 3–50:1. The proportion of an amino alcohol while varying with its basicity and molecular weight, will frequently be in the range of about 0.5–10 parts by weight to 1 part of diazo compound. Other compounds may be employed at rates corresponding thereto on the basis of the ammonia evolved or the resulting pH change.

The conditions of time and temperature for developing the image are selected for the system employed to produce the necessary alkaline reaction without undesirable decomposition of the diazo compound. The results are generally advantageous when the sensitive layer is subjected to a relatively high temperature of about 150° C. to 220° C. for a short time, ranging from a few seconds to about a minute. While rapid development is preferred, the materials can be heated for a longer period of time at a lower temperature. As an example, the temperatures reached in the sensitive layers can be about 205° C. to 220° C. for a period of about 6 to 15 seconds. These rates are very advantageous and enable a number of copies to be made in a short period of time.

Such temperatures may be provided in the sensitive layer in a number of ways. Thus, the primary source of the necessary heat may be a quartz lamp used in conjunction with an elliptical reflector so as to provide an intense zone of near infrared and infrared light. The lamp may produce a color temperaure of about 2750° K. with about 1500 watts. The reflector ellipse dimensions may be 0.750 inch for the minor axis and 0.845 inch for the major axis. The tungsten element of the lamp is located at one focus of the ellipse, and the surface of the original or master at the other.

The duplicating machine may be allowed to operate without cooling the parts, so that part of the heat increment is supplied by the parts such as the rollers or conveyor means, or the heat produced by absorption of the radiations may be supplemented in another manner. If the background diazo compound is first decomposed in the direct process the latent image produced thereby may be developed if desired by contact with a heated surface.

We claim:
1. Reproduction material which comprises: a supported layer of a visibly heat-sensitive composition, said composition comprising a mixture of a coupling diazo compound; an azo coupling component; a nitrogenous compound producing an alkaline reaction when heated, said nitrogenous compound being present in an amount sufficient to effect coupling of said diazo compound and said coupling component when heated; and a suspension of a metal sulfate selected from the group consisting of cadmium sulfate, zinc sulfate, nickel sulfate, cobalt sulfate, aluminum sulfate, magnesium sulfate, and ceric ammonium sulfate and a linear polymeric anhydride, said anhydride being the interpolymer of methyl vinyl ether and maleic anhydride, the ratio of nitrogenous compound to anhydride by weight being from about 1:1 to 20:1.

2. Reproduction material as in claim 1 wherein said metal sulfate is cadmium sulfate.

3. Reproduction material as in claim 2 wherein the compound producing an alkaline reaction is urea.

4. Reproduction material as in claim 3 wherein the ratio of urea to linear polymeric anhydride by weight is from about 4:1 to 15:1.

References Cited by the Examiner

UNITED STATES PATENTS

| | | | |
|---|---|---|---|
| 2,694,009 | 11/1954 | Sus | 96—49 X |
| 2,727,820 | 12/1955 | Botkin et al. | 96—49 |
| 2,807,545 | 9/1957 | Frederick | 96—91 X |
| 2,822,272 | 2/1958 | Kosalek et al. | 96—91 |
| 2,854,338 | 9/1958 | Herrick et al. | 96—75 |
| 3,224,878 | 12/1965 | Klimkowski et al. | 96—75 X |

FOREIGN PATENTS

| | | |
|---|---|---|
| 535,816 | 1/1957 | Canada. |
| 1,249,913 | 11/1960 | France. |
| 867,264 | 5/1961 | Great Britain. |

NORMAN G. TORCHIN, *Primary Examiner.*

R. L. STONE, C. L. BOWERS, *Assistant Examiners.*